3,090,901
MOTOR SPEED CONTROL SYSTEMS
Norman Harry Shaw, Kidsgrove, Stoke-on-Trent, England, assignor to The English Electric Company Limited, London, England, a British company
Filed June 7, 1960, Ser. No. 34,520
Claims priority, application Great Britain June 25, 1959
7 Claims. (Cl. 318—209)

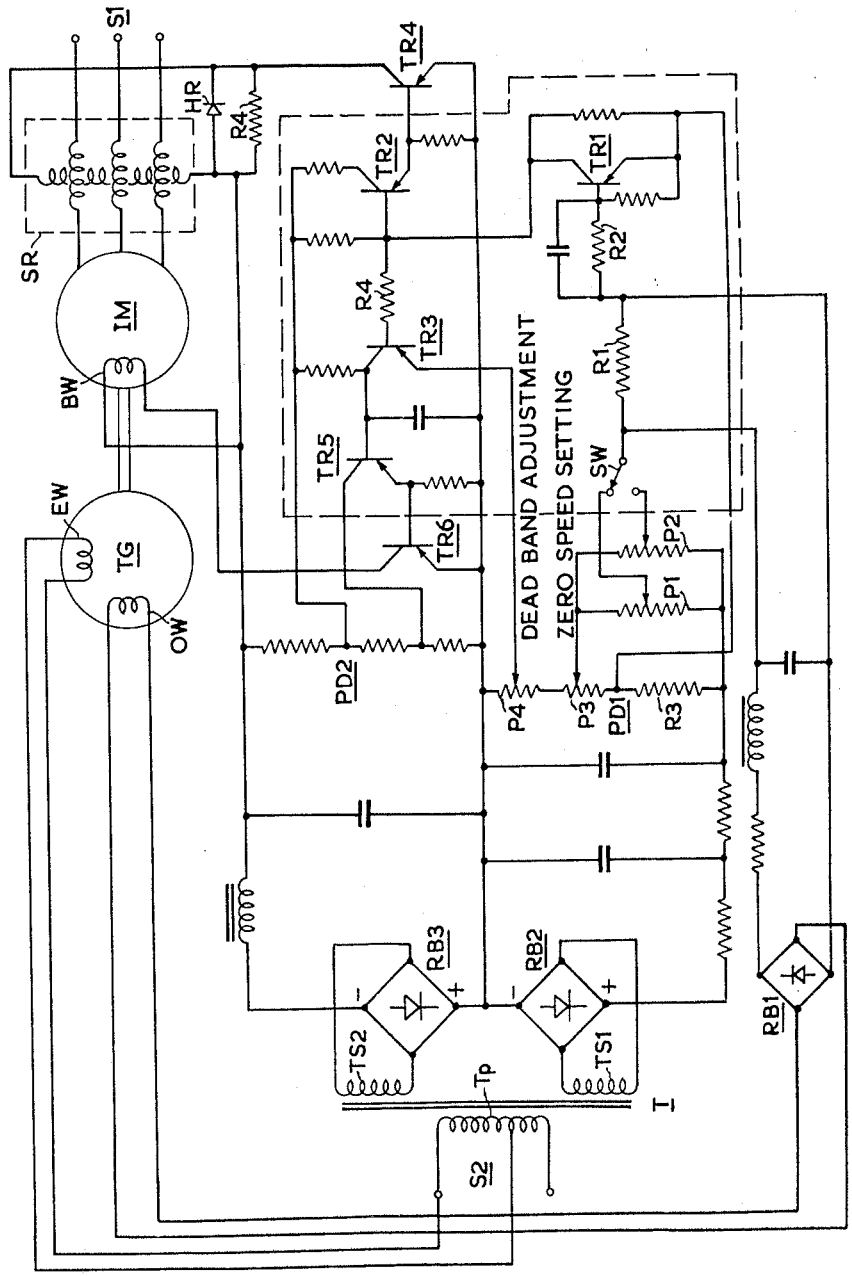

This invention relates to speed control systems for alternating current motors.

The system according to the invention includes, in combination, variable impedance means in the supply circuit to the motor, a control winding for the impedance, control means for varying the excitation of the control winding in a corrective sense in accordance with the difference between actual motor speed and a desired speed, and a brake winding for the motor, said control means being further arranged automatically to de-energize the control winding and energize instead the brake winding whenever the actual motor speed exceeds the desired speed.

According to a preferred feature of the invention the alternating current motor is of the squirrel cage type, the brake winding being carried by the stator core thereof.

According to a further preferred feature of the invention the variable impedance means comprises a saturable reactor having its A.C. windings connected in series with the motor and its D.C. windings supplied from said control means.

Further preferred features of the invention will appear from the following description with reference to the accompanying drawing where there is shown the schematic diagram of connections for a speed control system according to the invention for use with a ¼ H.P. squirrel cage 3-phase induction motor.

Referring now to the drawing, the induction motor IM is supplied from a 3-phase source S1 via the A.C. coils of a saturable reactor SR and includes a separate brake winding BW. The motor is directly coupled to an A.C. tachometer generator TG having an exciting winding EW, supplied from a single phase source S2, and an output winding OW connected to supply a full wave rectifier bridge RB1.

The output from this rectifier bridge is applied across a resistor R1, one end of the resistor being connected via a resistor R2 to the base of a transistor TR1. The other end of the resistor R1 is connected to a two-way switch SW arranged to connect the resistor to either one or the other of two speed setting potentiometers P1 and P2.

The two potentiometers are supplied from a potential divider circuit PD1 consisting of a potentiometer P3, providing adjustment of the zero speed setting, a potentiometer P4, providing adjustment of the "dead band," and a fixed resistor R3. The potential divider circuit is supplied from a rectifier bridge RB2 in turn supplied from the secondary winding TS1 of a supply transformer T, the primary winding Tp of the transformer being supplied from the source S2. The emitter of the transistor TR1 is connected to a tapping point on the potential divider PD1.

The collector of the transistor TR1 is connected directly to the base of a transistor TR2 and through a resistor R4 to the base of a transistor TR3. The emitter of the transistor TR2 is connected to the base of a transistor TR4, the emitter of this transistor being connected to the positive terminal of a rectifier bridge RB3 supplied from a secondary winding TS2 on the transformer T, and the collector being connected to the negative terminal of the rectifier bridge through a circuit including the D.C. winding of the saturable reactor SR. A resistor R5 and a half-wave rectifier HR are connected across the D.C. winding of the saturable reactor to provide a discharge path for the self induced voltage in the winding. The transistors TR2 and TR4 form a two stage amplifier between the transistor TR1 and the D.C. winding of the saturable reactor.

The emitter of the transistor TR3 is supplied from the "dead band" adjustment potentiometer P4 whilst the collector is connected to the base of a transistor TR5. The emitter of transistor TR5 is connected directly to the base of a transistor TR6, the emitter of this transistor being connected to the positive terminal of the rectifier bridge RB3 and the collector being connected to the negative terminal of the bridge via the brake winding BW on the induction motor M. The collectors of the transistors TR1, TR2, TR3 and TR5 are supplied from a potential divider PD2 connected across the rectifier bridge RB2. The transistors TR3, TR5 and TR6 form a three stage amplifier between the transistor TR1 and the brake winding BW.

Assuming the speed setting potentiometer P1 to be connected in circuit by the switch SW, this potentiometer is first set to the zero speed position and the potentiometer P3 is adjusted so that the voltage applied to the base of the transistor TR1 is such that the potential at the base of the transistor TR2 is approximately zero. The output from the transistor TR4 will, under these conditions, be negligible, so that the control winding of the saturable reactor will be unexcited and no current will flow through the induction motor IM.

The potentiometer P4 is also adjusted so that the potential applied to the emitter of the transistor TR3 is more positive than the base potential. The normal voltage at the collector of this transistor can therefore be held to zero or even made slightly positive, thus cutting off transistors TR5 and TR6 so as to maintain the brake winding BW on the induction motor unexcited.

Movement of the potentiometer P1 in the direction to accelerate the motor will now result in the application of an error signal to the base of the transistor TR1 and this signal will be amplified by the transistors TR2 and TR4 with the result that the control winding of the saturable reactor SR will be energized by an amount dependent on the speed error. The induction motor IM will accordingly accelerate until the voltage across the resistor R1 almost equals the voltage across the speed setting potentiometer P1 and the speed will then be automatically maintained at the desired value.

If for any reason the speed error signal should reverse, for example by reason of adjustment of the potentiometer P1 to a lower speed setting, the extra current output from the transistor TR1 reduces the base current of transistor TR3 and so allows the potential of the collector to go negative. Transistors TR5 and TR6 are thus automatically rendered conducting whereby to excite the brake winding of the induction motor and will maintain the winding excited until the motor speed falls to the new value.

In setting up the circuit it is desirable to adjust the potentiometer P4 so as to obtain a small "dead band" in the control before the brake winding BW is energized.

The apparatus will, of course, operate in exactly the same way with the potentiometer P2 in circuit instead of the potentiometer P1. The provision of two potentiometers allows for automatic changeover of motor speed from one preset value to another preset value, for example by arranging the switches to be cam actuated at a predetermined point in the operating cycle of a machine, such as a knitting machine, driven by the motor.

The brake winding BW of the induction motor IM is wound for 2 poles and the A.C. windings for 4 poles so that the A.C. induced voltage in the brake winding is reduced to a minimum.

Other forms of amplifiers may be used, for example, electronic or magnetic amplifiers.

What I claim as my invention and desire to secure by Letters Patent is:

1. A speed control system for an alternating current electric induction motor having a squirrel cage rotor and a stator having running winding means and braking winding means, comprising in combination, speed determining variable impedance means in the electric power supply circuit to said motor, first control means for predetermining the effective impedance of said impedance means, and second control means responsive to the speed of the motor for automatically varying the said effective impedance of said impedance means in a corrective sense in accordance with a negative speed error of the motor speed and for simultaneously energizing said braking winding and automatically altering the effective impedance of said impedance means to such a value that the motor is substantially de-energised if the speed error of the motor becomes positive.

2. A speed control system for an alternating current electric motor having a squirrel cage rotor and a stator having running winding means and braking winding means, comprising in combination, motor-speed determining variable impedance means having main winding means connected in the electric power supply circuit to said running winding means and control winding means for effecting variations in the impedance of said main winding means, first control means for determining the effective impedance of said speed-determining variable impedance means for energising the motor so as to operate at a desired speed, and second control means responsive to the speed of the motor for varying the excitation of said control winding means for altering the effective impedance of said main winding means in a corrective sense in accordance with the difference between the desired motor speed and a motor speed below the desired speed and for energising said braking winding means and simultaneously adjusting the energisation of said control winding means so that said main winding means assumes an impedance which effectively de-energises the motor whenever the motor speed exceeds the desired motor speed.

3. A speed control system as claimed in claim 2, wherein said first control means determines the effective impedance of said speed-determining variable impedance means by varying the excitation of said control winding means.

4. A speed control system for an alternating current electric motor having a squirrel cage rotor and a stator having running winding means and braking winding means, comprising in combination, a saturable reactor having a motor-speed determining alternating current winding means connected in the electric power supply circuit to said running winding means and a direct current control winding means for effecting variations in the impedance of said alternating current winding means, first control means for varying the excitation of said control winding means for determining the effective impedance of said speed-determining alternating current winding means for energising said motor to operate at a desired speed, and second control means responsive to the speed of the motor for varying the direct current excitation of said control winding means for altering the effective impedance of said alternating current winding in a corrective sense in accordance with the difference between the desired motor speed and a motor speed below the desired speed and for energising said braking winding means and simultaneously adjusting the direct current energisation of said control winding means so that said alternating current winding means assumes a value of impedance which effectively de-energises the motor whenever the actual motor speed exceeds the desired motor speed.

5. A speed control system for an alternating current electric motor having a squirrel cage rotor and a stator having running winding means and braking winding means, comprising in combination, a motor-speed determining variable impedance means having main winding means connected in the electric power supply circuit to said running winding means and control winding means for effecting variations in the impedance of said main winding means, first control means for varying the excitation of said control winding means for determining the effective impedance of said main winding means for energising said motor to operate at a desired speed, control circuit means for generating an error signal representative of any departure of motor speed from the desired motor speed, a first electric amplifier having its input connected to the output of said control circut means and having its output connected to said control winding means for energising said control winding means in a corrective sense in accordance with said error signal for altering the effective impedance of said main winding means only when the actual motor speed is below the desired motor speed and being effective to adjust the energisation of said control winding means so that said main winding means assumes a value of impedance which effectively de-energises said motor whenever the actual motor speed exceeds the desired motor speed, and a second electric amplifier having its input connected to the output of said control circuit means and having its output connected to said braking winding means for energising the braking winding means only when the actual motor speed exceeds the desired motor speed by more than a predetermined amount.

6. A speed control system as claimed in claim 5, wherein said control circuit means comprises an alternating current tachometer generator, rectifying means for converting the output of the generator to direct current, an adjustable direct current reference source, and means for comparing the two direct current voltages so as to produce a voltage output dependent upon the difference.

7. A speed control system for a polyphase alternating current electric motor having a squirrel cage rotor and a stator having a polyphase running winding and a braking winding, comprising in combination, a polyphase saturable reactor having a motor-speed determining polyphase alternating current winding means connected in the electric power supply circuit to said polyphase running winding, and a direct current control winding associated with said polyphase alternating current winding means for effecting variations in the impedance of each phase winding thereof, first control means for varying the excitation of said control winding means for determining the effective impedance of said polyphase alternating current winding means for energising said motor to operate at a desired speed, second control means responsive to the speed of the motor for varying the excitation of said control winding means for altering the effective impedance of each phase winding of said alternating current winding means in a corrective sense in accordance with the difference between the desired motor speed and a motor speed below the desired speed and for energising said braking winding means and simultaneously adjusting the energisation of said control winding means so that the impedance of each phase winding of said polyphase alternating current winding means assumes a value of impedance which effectively de-energises the motor whenever the actual motor speed exceeds the desired motor speed.

References Cited in the file of this patent

FOREIGN PATENTS 677,358   Great Britain _____ Aug. 13, 1952